United States Patent [19]
Parfitt et al.

[11] 3,823,984
[45] July 16, 1974

[54] BRAKING SYSTEMS

[75] Inventors: Maurice Parfitt; Keith William Langley, both of London, England

[73] Assignee: Westinghouse Brake and Signal Company, Limited, London, England

[22] Filed: June 13, 1973

[21] Appl. No.: 369,543

[30] Foreign Application Priority Data
July 4, 1972 Great Britain.................... 31278/72

[52] U.S. Cl..................................... 303/3, 303/15
[51] Int. Cl.............................................. B60t 13/74
[58] Field of Search........................... 303/3, 15–17, 303/20

[56] References Cited
UNITED STATES PATENTS
3,761,137  9/1973  Green et al............................ 303/3

Primary Examiner—Duane A. Reger
Attorney, Agent, or Firm—Larson, Taylor and Hinds

[57] ABSTRACT

A braking system is proposed incorporating both a fluid-pressure controlled mechanical brake and an electric brake; the system having a source of fluid pressure, an output valve operative to derive from that source an output pressure which controls the degree of operation of the mechanical brake, a plurality of fluid-pressure responsive members operatively connected to the valve to operate the valve in accordance with the forces generated on the members by fluid pressures applied thereto and thus to derive said output pressure, a plurality of selectively-energisable electromagnetically-operated valves operable in accordance with their state of energisation to apply fluid-pressure to associated ones of the fluid-pressure responsive members accordingly to operate said output valve, a converter by which an electrical input signal indicative of the degree of effectiveness of the electric brake is converted into a fluid-pressure output signal the value of which corresponds to the value of the electrical input signal, and means for applying the fluid-pressure output signal of the converter to the stack of fluid-pressure responsive members, the output signal (when present) of the converter thus modifying the valve of the output pressure from the output valve derived by the selective energisation of the electromagnetically-operated valves from that which it would otherwise have been.

10 Claims, 1 Drawing Figure

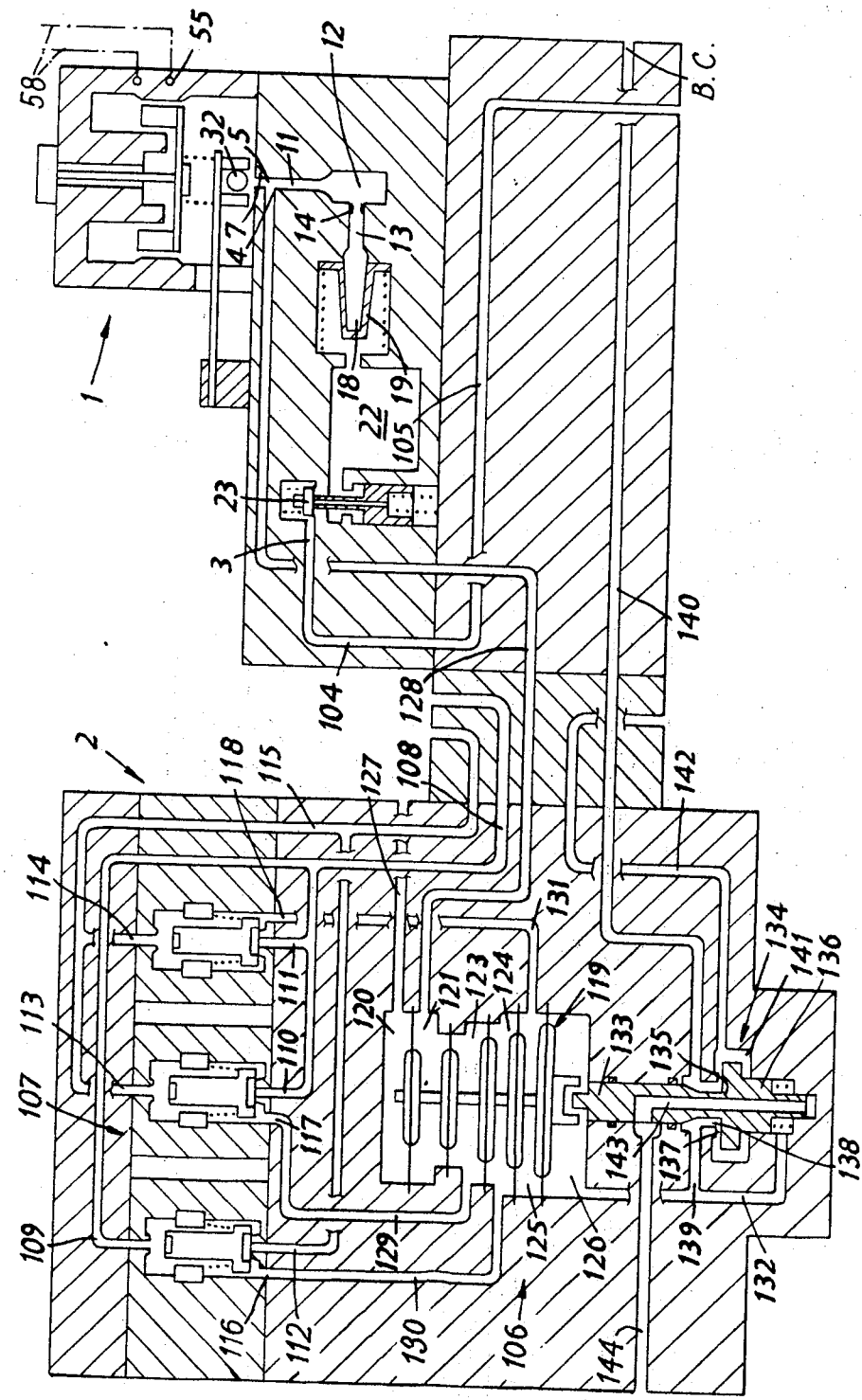

BRAKING SYSTEMS

This invention relates to braking systems and, more particularly, to braking systems incorporating both a fluid-pressure controlled mechanical brake and an electric brake.

The present invention provides a braking system incorporating both a fluid-pressure controlled mechanical brake and an electric brake; the system having a source of fluid pressure, an output valve operative to derive from that source an output pressure which controls the degree of operation of the mechanical brake, a plurality of fluid-pressure responsive members operatively connected to the valve to operate the valve in accordance with the forces generated on the members by fluid pressure applied thereto and thus to derive said output pressure, a plurality of selectively-energisable electromagnetically-operated valves operable in accordance with their state of energisation to apply fluid-pressure to associated ones of the fluid-pressure responsive members accordingly to operate said output valve, a converter by which an electrical input signal indicative of the degree of effectiveness of the electric brake is converted into a fluid-pressure output signal the value of which corresponds to the value of the electrical input signal, and means for applying the fluid-pressure output signal of the converter to the stack of fluid-pressure responsive members, the output signal (when present) of the converter thus modifying the value of the output pressure from the output valve derived by the selective energisation of the electro-magnetically-operated valves from that which it would otherwise have been.

The source of fluid-pressure may be a main reservoir of the system.

The output valve in association with the plurality of fluid-pressure responsive members may constitute a self-lapping valve.

The plurality of fluid-pressure responsive members may be a stack of diaphragms mechanically connected one to each other and to a valve member of the output valve.

The plurality of fluid-pressure responsive members may provide between them a plurality of chambers to one of which is applied the fluid-pressure output signal of the converter to another of which is applied the output pressure and to each of the others of which is applied the fluid-pressure from a corresponding one of the selectively-energisable electromagnetically-operated valves.

The selectively energisable electromagnetically-operated valves may be "on-off" valves.

The converter may be as claimed in any one of the claims of our co-pending Patent Application Ser. No. 224,057.

One embodiment of the present invention will now be described in greater detail, by way of example only, with reference to the accompanying drawing which is a diagrammatic cross-sectional view of that part of braking equipment which incorporates the present invention.

The part of the braking equipment shown in the accompanying drawing is for incorporation in railway braking equipment of the type including an electric braking system in the form of a dynamic braking system and an electro-pneumatic system. Such equipment is, of itself, well-known and a typical such system is the so-called "Westcode" (Registered Trade Mark) braking equipment described, for example, in Appendix 8 of "An Introduction to Railway Braking" by H. R. Broadbent and in more detail in the Paper entitled "Combined Air and Dynamic Braking Systems for Railway Vehicles, Particularly the New Lightweight Cars for the Toronto Transit Commission" by Dr. I. G. Moore presented before the Institution of Locomotive Engineers on the December 16, 1963 and published in that Institution's Journal as Paper number 651.

In view of the disclosure in these documents of this now well-known type of braking equipment, only a very general description of this equipment is required in this Specification.

So far as the present invention is concerned, the "Westcode" equipment includes an electro-pneumatic system controlled by the selective energisation in various combinations of wires which pass the length of the train and which, on each vehicle of the train, energise the selected combination of electro-magnetic valves the pneumatic outputs of which are applied to a plurality of various-sized diaphragms to operate a self-lapping valve to produce therefrom a pneumatic pressure output which is applied to the brake cyclinder of the vehicle to effect through the electro-pneumatic braking system a degree of braking determined by the combination of energisation of the wires.

The "Westcode" braking equipment is particularly of application on railway vehicles of high-density commuter systems and such vehicles frequently carry in addition to the mechanical brake controlled by the "Westcode" braking equipment, a dynamic brake.

The present invention is concerned with the problem of "blending" of the effectiveness of the dynamic braking system with that of the electro-pneumatically-controlled mechanical brake.

It is well-known that the effectiveness of a dynamic brake falls-off with the speed of the vehicle and that in a braking system in which such a dynamic brake is incorporated, it is desirable that means should be provided for causing the electro-pneumatically-controlled brake to take-over from the dynamic brake as the latter's effectiveness drops-off.

Turning now to the accompanying drawing, the part of the equipment here shown comprises, essentially, two units. Firstly, there is an electro-pneumatic converter 1 and, secondly, there is the unit 2.

The electro-pneumatic converter 1 is substantially identical to the valve means described and claimed in our co-pending Patent Application Ser. No. 224,057. This being so, only a most general description of the converter 1 is necessary herein and in the following description of the converter, identical reference numerals are used for corresponding parts of the converter described and claimed in our co-pending Patent Application Ser. No. 224,057.

The input port 3 of the converter is connected via conduits 104 and 105 to the conventional main reservoir (not shown) or brake pipe, or emergency pipe of the braking system so that the fluid pressure in that main reservoir constitutes the source of fluid pressure for the converter 1. From the input port 3, fluid pressure can flow past the valve element 23 to chamber 22 from whence it will flow via the filter 19 into chamber 18. From the chamber 18, fluid will flow through the conduit 13 incorporating the choke 14 to the chamber 12 and, through the conduit 11 it will be presented at the exhaust port 5.

Depending upon the degree of throttling of the exhaust port 5 by the ball 32 being variably spaced from the valve seat 7, the fluid-pressure appearing at the exhaust port 5 will to a greater or lesser extent escape through the valve seat 7. As a result, the pressure in the chamber 12 will drop to a value dependent upon the degree of throttling of the valve seat 7 by the ball 32, and this pressure will be applied at the fluid-pressure output port 4.

The variable throttling of the exhaust port 5 by the ball 32 will be dependent upon the force downwardly exerted on the ball 32 which force, in turn will be dependent upon the value of an electrical input signal indicative of the effectiveness of the dynamic brake, applied over leads 58 to the electro-magnetic oil 55.

As is explained in our co-pending Patent Application Ser. No. 224,057 the value of the pneumatic output pressure appearing at output port 4 will be dependent upon the value of the input electrical signal applied to the leads 58.

Turning now to the unit 2, this unit comprises the Stepped Relay Valve 106 and the E.P. Brake Magnet Valves 107 of the "Westcode" Brake Unit.

As in the "Westcode" Brake Unit, the E.P. Brake Magnet Valves 107 (of which there are three) are arranged to be supplied with fluid-pressure over the common conduit 108 and the individual conduits 109, 110, and 111. The valves 107 have exhaust ports connected via individual conduits 112, 113 and 114 to an exhaust conduit 115. Additionally, the valves 107 have outlet ports 116, 117 and 118.

In the Stepped Relay Valve is a stack of diaphragms 119 which provide a series of chambers 120, 121, 123, 124, 125 and 126. The chamber 120 is connected to atmosphere over conduit 127; the chamber 121 is connected over conduit 123 to the output port 4 of the converter 1; the chamber 123 is connected over conduit 129 with the outlet port 117 of one of the valves 107; the chamber 124 is connected via conduit 130 to the output port 116 of a second of the valves 107; the chamber 125 is connected over the conduit 131 to the output port 118 of the third of the valves 107 and the chamber 126 is connected to conduit 132.

The diaphragms of the stack 119 are mechanically connected one to each other and the stack is connected to a valve element 133 of a valve 134 which together with the stack 119 of diaphragms constitutes a self-lapping valve.

The valve element 133 provides at its lower end a valve seat 135 engageable with a valve closure member 136 which is also engageable with a fixed valve seat 137 encircling the valve seat 135 on the lower end of the valve member 133. The valve member 133 protrudes at its lower end into a chamber 138 on the upper side of the valve closure member 136 and this chamber 138 communicates, on one side, via a conduit 139 with the conduit 132 and, on the other side, via a conduit 140 to the pneumatic brake cylinder of the mechanical brake (not shown). On the other side of the valve closure member 136 is a chamber 141 which communicates via conduit 142 with a source of fluid pressure. The valve member 133 has extending partially alone its length, a bore 143 communicating with atmosphere via a conduit 144. Putting on one side, for the time being, the converter 1, the unit 2 operates in the conventional manner of the "Westcode" Brake Unit. That is to say, by selective energisation of the electromagnetic valves 107, fluid pressure supplied to the valves via conduit 108 is applied to those of the chambers 123, 124 and 125 associated with those of the valves 107 whose state of energisation is such as to communicate their inlet ports with their outlet ports. Thus, a downwardly-directed force will be generated on the stack 119 of diaphragms in dependence upon the states of energisation of the valves 107. Such downwardly-directed force will cause the valve member 113 to engage the valve closure member 136 and thus move it out of engagement with the valve seat 137. Such actuation of the valve 134 will communicate the chamber 141 with the chamber 139 and allow pneumatic pressure to flow from the source via the conduit 142 to the chamber 138 from whence it will flow, on the one hand, to the brake cylinder via the conduit 140 and, on the other hand, via the conduits 139 and 132 to the chamber 126 beneath the stack 119 of diaphragms. The pressure in chamber 126, will, therefore, increase with that chamber being shut-off from consideration with atmosphere via conduit 144 by the valve seat 135 being engaged with the valve closure member 136. The pressure in the chamber 126 will continue to rise until the upwardly-directed force generated by this increasing pressure in the chamber 126 balances the downwardly-directed force generated by the pressurisation of the respective one(s) of the chambers 123, 124 and 125. Eventually, a balance of forces in the stack 119 will be achieved so that the valve member 133 returns upwardly to allow the valve closure member 135 to re-engage the valve seat 137. At this point, further supply of fluid pressure to the chamber 126 and the brake cylinder will be cut-off and the pressure in the brake cylinder and that chamber 126 will have been determined by the selected state of energisation of the valves 107. It will be seen that any variation in the state of energisation of the valves 107 will produce a corresponding variation in the pressurisation of the chambers 123, 124, and 125 and, therefore, a corresponding variation of the pressurisation of the brake cylinder and the chamber 126.

The description above is of the system operating without the dynamic brake being effective.

However, if the dynamic brake is effective an electrical signal will be applied to the leads 58 the value of which is dependent upon the degree of effectiveness of the dynamic brake and the value of the fluid pressure appearing at the output port of the converter 1 will similarly have a value which is dependent upon the degree of that effectiveness. This pressure will be applied (as described above) over conduit 128 to the chamber 121. The pressure appearing in this chamber will be applied to the upper two of the diaphragms in the stack 119 but as the uppermost of the diaphragms is of larger diameter than the next lower, the appearance of pressure in the chamber 121 will generate a resultant upwardly-directed force on the stack 119. This resultant upwardly-directed force (the value of which will, again, be dependent upon the degree of the effectiveness of the dynamic brake) will detract from the downwardly-directed force generated on the stack 119 by such pressures as there may be in the chambers 123, 124 and 125 dependent upon a selected state of energisation of the valves 107. Consequently, the valve 134 will be set to provide an output pressure which will have a valve lower than that which it would have had but for effectiveness of the dynamic brake. Indeed, it will be reduced by an amount which will be dependent upon that degree of effectiveness. Consequently, the effectiveness of the mechanical brake will be reduced by an amount dependent upon the degree of effectiveness of the dynamic brake.

As the effectiveness of the dynamic brake "falls-off" with reducing speed of the vehicle, the output pressure at the port 4 of the converter will similarly "fall-off" as will also the pressure in the chamber 121. As the pressure in the chamber 121 falls, the resultant upwardly-directed force which it is generating on the stack 119 will reduce so that the output pressure of the valve 134 is caused to increase correspondingly as a balance of forces in the stack 119 is sought. It can thus be seen that as the effectiveness of the dynamic brake "falls-away" such loss of overall braking will be made good by increased effectiveness of the mechanical brake. It will be seen that this situation will occur no matter what degree of mechanical braking was being required by the selected state of energisation of the valves 107.

Having thus described our invention what we claim is:

1. A braking system incorporating both a fluid-pressure controlled mechanical brake and an electric brake; the system having a source of fluid pressure, an output valve operative to derive from that source an output pressure which controls the degree of operation of the mechanical brake, a plurality of fluid-pressure responsive members operatively connected to the valve to operate the valve in accordance with the forces generated on the members by fluid pressures applied thereto and thus to derive said output pressure; a plurality of selectively-energisable electromagnetically-operated valves operable in accordance with their state of energisation to apply fluid-pressure to associated ones of the fluid-pressure responsive members accordingly to operate said output valve, a converter by which an electrical input signal indicative of the degree of effectiveness of the electric brake is converted into a fluid-pressure output signal the value of which corresponds to the value of the electric input signal, and means for applying the fluid-pressure output signal of the converter to the stack of fluid-pressure responsive members, the output signal (when present) of the converter thus modifying the value of the output pressure from the output valve derived by the selective energisation of the electro-magnetically-operated valves from that which it would otherwise have been.

2. A braking system as claimed in claim 1 wherein the source of fluid pressure is a main reservoir of the system.

3. A braking system as claimed in claim 2, wherein the output valve in association with the plurality of fluid pressure responsive members constitutes a self-lapping valve.

4. A braking system as claimed in claim 3 wherein the plurality of fluid-pressure responsive members comprises a stack of diaphragms mechanically connected one to each other and to a valve member of the output valve.

5. A braking system as claimed in claim 4, wherein the plurality of fluid-pressure responsive members may provide between them a plurality of chambers to one of which is applied the fluid-pressure output signal of the converter to another of which is applied to output pressure and to each of the others of which is applied the fluid-pressure from a corresponding one of the selectively-energisable electromagnetically-operated valves.

6. A braking system as claimed in claim 5, wherein the selectively energisable electro-magnetically-operated valves may be "on-off" valves.

7. A braking system as claimed in claim 1, wherein the converter comprises valve means having first means a part of which is movable throughout a range of operational movement, said part being movable upon variation of an applied signal; damping means effective in operation of the valve means to damp vibrational movement of said part to a relatively small proportion of the range of operational movement of said part; resilient means to which is applicable motion of said part and which is effective to translate said motion into an output force the value of which varies with such motion; and valve closure means movable throughout a range of operational movement thereof relative to a valve seat variably to throttle escape of fluid from the valve seat and to which the resilient means applies said output force to act against the force exerted on the member in opposition thereto by the pressure of the escaping fluid, the range of operational movement of the valve closure member being relatively small as compared to the range of operational movement of said port.

8. A braking system as claimed in claim 1, wherein the output valve in association with the plurality of fluid pressure responsive members constitutes a self-lapping valve.

9. A braking system as claimed in claim 8, wherein the plurality of fluid-pressure responsive members comprises a stack of diaphragms mechanically connected one to each other and to a valve member of the output valve.

10. A braking system as claimed in claim 1, wherein the plurality of fluid-pressure responsive members comprises a stack of diaphragms mechanically connected one to each other and to a valve member of the output valve.

* * * * *